United States Patent Office 3,261,222
Patented July 19, 1966

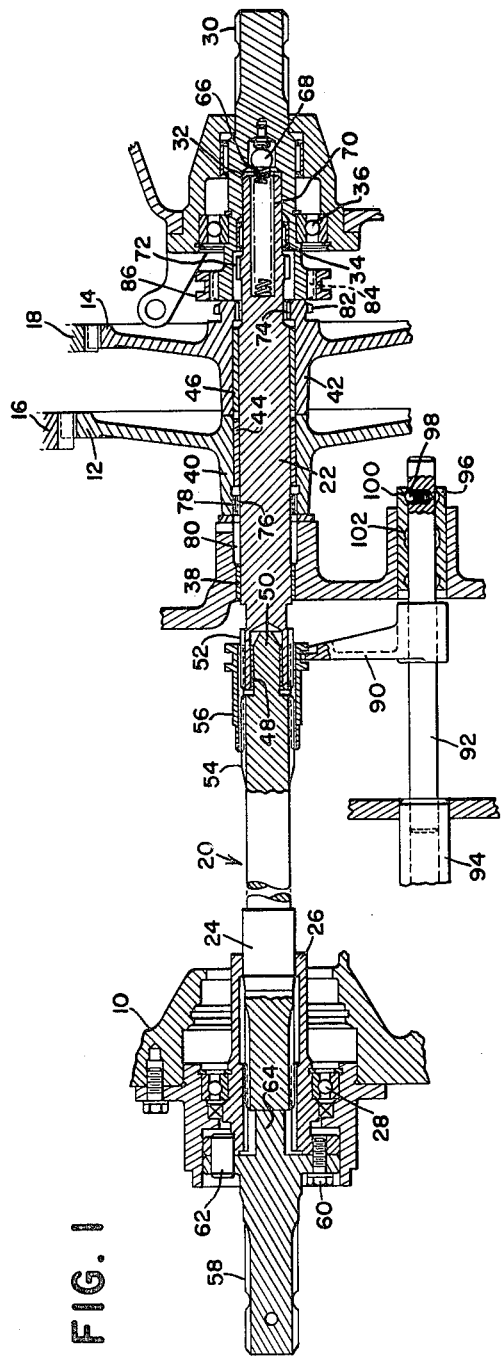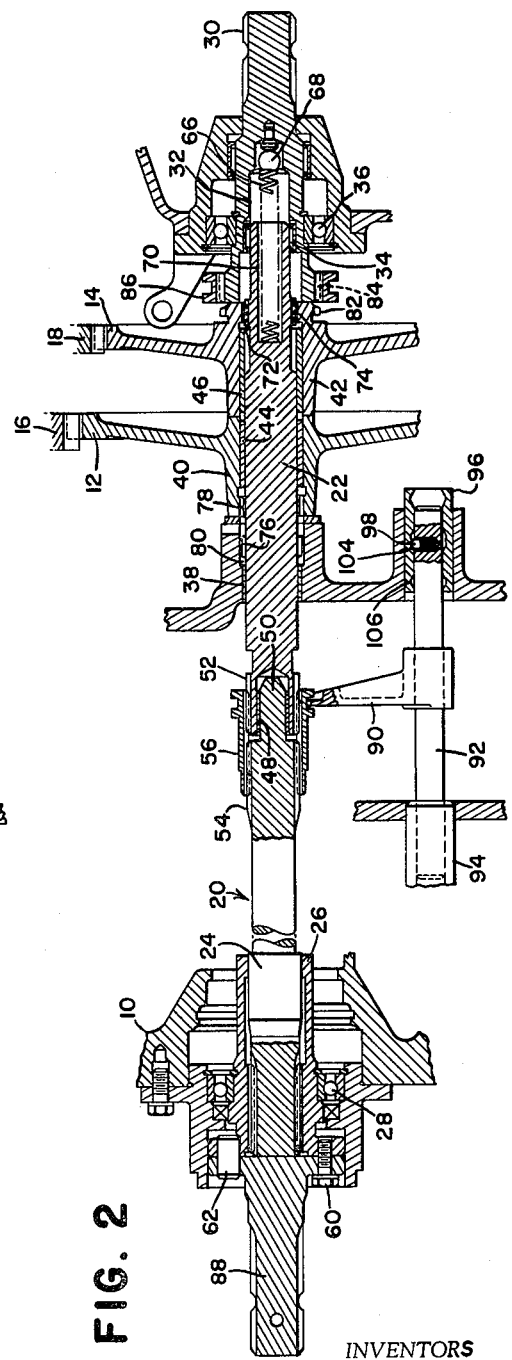

3,261,222
DUAL-SPEED MULTIPLE PTO
Karl H. Fresmann, Waterloo, and George W. Pakala, Cedar Falls, Iowa, assignors to Deere & Company, Moline, Ill., a corporation of Delaware
Filed Aug. 20, 1964, Ser. No. 390,945
10 Claims. (Cl. 74—375)

This invention relates to a PTO or power take-off for vehicles such as agricultural and industrial tractors and more particular to a PTO that affords at least two speeds and additionally provides a one-speed PTO at the opposite end of the PTO drive. As applied to a tractor, for example, this would make available at the rear of the tractor a slow-speed PTO and a high-speed PTO and at the front of the tractor a single-speed PTO.

Dual-speed PTO's of the general character referred to have heretofore been utilized. One example of such construction is that forming the subject matter of U.S. Patent 2,968,188 to W. H. DuShane, patented January 17, 1961. The present invention is an improvement over that construction in many respects.

One of the significant objects of the invention is to provide a simplified design in which a shaft is shiftable axially between two positions, in one of which it engages exclusively with a gear driven at one speed and in the other of which it engages exclusively with another gear driven at a different speed. The rear end of the power shaft is provided with a PTO adapter which in one instance has a projection thereon which causes the shaft to shift forwardly, for example, to its slow-speed condition. A second adapter replaces the first adapter and is provided without a projection, thereby allowing the shaft to be returned to its high-speed condition, the forward end of the shaft being provided with a spring for accomplishing this latter result. According to the present invention, the forward end of the shaft is provided with a front PTO shaft which in turn journals the forward end of the main power shaft and also carries the biasing spring. It is a further feature of the invention to provide the two gears in close coaxial relationship, each gear having an axially apertured hub which is provided with an internal set of clutch teeth. The main shaft has a pair of external clutch teeth spaced apart thereon and matching the internal teeth, and these are so arranged that one set of shaft teeth is engageable with one set of gear teeth in either position of the shaft but both shaft sets cannot engage both hubs sets simultaneously. The construction features the provision of the shaft sets in spaced apart relationship greater than the spacing between the hub sets, the latter being respectively at opposite remote ends of the hubs so that when the shaft is shifted in one direction or the other, one hub set engages one shaft set and the other shaft set projects externally beyond the other hub. In one case, the housing for the gearing includes a recess which accommodates the projecting shaft set and in the other case the forward PTO has a recess which accommodates the other hub set. A further feature of the invention is that the main power shaft is provided as a pair of coaxial end-to-end sections, interjournaled and provided respectively with complementary external spline sets on which is mounted an internally splined coupling sleeve shiftable between two positions, in one of which it engages both spline sets and in the other of which it is carried by one spline set but is disengaged from the other. It is another object of the invention to provide control means for the shiftable sleeve and to mount the control means for selective shifting according to changes in position of the shaft so as to accommodate itself to its requirement that it be able to connect and disconnect the sleeve in either position of the main shaft.

The foregoing and other important features and desirable objects inherent in and encompassed by the invention will become apparent as the preferred embodiment of the invention is disclosed, by way of example, in the ensuing description and accompanying sheet of drawings, the figures of which are described below.

FIG. 1 is a longitudinal sectional view, with portions omitted, showing the PTO drive in its low-speed condition, the main power shaft being shifted forwardly.

FIG. 2 is a similar view but shows the drive in its high-speed condition, the main shaft being shifted rearwardly.

The numeral 10 designates in general any suitable supporting structure, such as a tractor housing. For purposes of orientation, the longitudinal center line of the drive may be regarded as extending fore and aft and the left-hand end of the sheet will therefore be the rear end of the tractor. At the forward end of the housing 10 are provided first and second gears 12 and 14, coaxial on a fore-and-aft axis. These gears are driven respectively by drive gears 16 and 18, the ratios being such that the gear 14 is driven at a higher speed than the gear 12. In the agricultural field, designers have standardized on PTO speeds of 540 r.p.m. and 1000 r.p.m. On this basis then the gear 14 is the 1000 r.p.m. gear and the gear 12 is the 540 r.p.m. gear. These gears are selectively connectable to a main power shaft, indicated in its entirety by the numeral 20, to drive this shaft selectively at either of the aforesaid speeds.

The shaft 20 is made up of front and rear coaxial end-to-end sections 22 and 24, the rear end being coaxially splined to a sleeve 26 which is journaled by bearings 28 in a rear portion of the housing or support 10; and the intermediate portion of the front section 22 is journaled in the forward portion of the support by means of a forward PTO shaft 30 which is axially hollow as by having a rearwardly opening bore 32 within which is provided an internal bearing for journaling the section 22. The shaft 30 itself is journaled in a forward portion of the support 10 by a bearing 36. The rear portion of the power shaft section 22 is additionally journaled by a bearing 38 in an intermediate portion of the housing 10.

The gears 12 and 14 respectively have hubs 40 and 42 which are axially apertured or bored and fitted with bushings or bearings 44 and 46 by means of which the gears are journaled directly on the intermediate portion of the power shaft front section 22.

The rear end of the shaft section 22 has a rearwardly opening axial bore 48 therein which carries the reduced forward end 50 of the rear section 24 to effect an interjournaling of the two shafts. The external portion of the rear end of the shaft 22 is provided with a set of splines 52 which match a second set of splines 54 provided on the forward end of the rear section 24. The two spline sets are connectible and disconnectible by means of an internally splined coupling sleeve 56. When this splined sleeve is shifted to the rear or to the left as seen in FIG. 1, it will clear the spline set 52 and therefore disconnect the shaft sections. As will be brought out below, the sleeve 56 is shiftable between two positions to connect and disconnect the shaft sections in the 1000 r.p.m. condition of FIG. 2.

A coaxial rear PTO adapter 58 is detachably connectible to the rear splined sleeve 26 as by a plurality of cap screws 60 and dowels 62. The forward end of this adapter has a forward projection 64 thereon which effects a forward shifting of the entire power shaft 20 against a compression spring 66 which abuts at one end against a ball 68 at the blind end of the front PTO shaft bore 32, the opposite end of the spring abutting against the blind end of a bore 70 in the front end of the shaft section 22. In this condition of the drive, an external annulus or set of clutch teeth 72 on the forward portion of the shaft is axially offset or disengaged from an internal annulus or set of clutch teeth 74 within the proximate end of the hub 42 of the gear 14. At the same time, a second set or annulus of clutch teeth 76 on the shaft 20 becomes engaged with a matching internal annulus or set of clutch teeth 78 at the rear end of the hub 40 of the gear 12. Thus, the shaft 20 is connected to and driven exclusively by the gear 12 which, as previously said, is operating at 540 r.p.m. so that the rear PTO adapter 58 produces that speed at the rear of the tractor.

It should be noted at this point that the internal clutch teeth 74 and 78 respectively on the hubs 40 and 42 are at the axially opposite or remote ends of the hubs, here the front end of the hub 42 and the rear end of the hub 40. The axial spacing between the shaft teeth 72 and 76 is greater than that between the hub teeth 74 and 76 so that both sets of teeth cannot be engaged simultaneously. When the shaft is shifted forwardly, as in FIG. 1, the teeth 72 are accommodated within the rear part of the bore 32 in the front PTO 30. When the shaft is shifted rearwardly, as in FIG. 2, to engage the teeth 72 and 74 and to disengage the teeth 76 and 78, the shaft teeth 76 of course move rearwardly beyond the rear end of the hub 40 but are accommodated by a recess 80 in an adjacent portion of the housing 10. This portion of the housing provides a rear abutment for the hub 40. The two hubs abut, as will be clear, and the forward end of the hub 42 abuts the rear end of the front PTO 30.

This forward end of the hub 42 has external clutch teeth 82 thereon which match similar clutch teeth 84 on the rear end of the front PTO 30. A shifting internally toothed collar 86 is shiftable back and forth across the complementary clutch teeth 82 and 84 to connect and disconnect the gear 14 and front PTO 30. In the condition of the parts shown, the collar is disconnected and therefore the front 30 is idle. It should be noted that the speed of the front PTO depends entirely on the speed of the gear 14, which, as stated above, is 1000 r.p.m.

When it is desired to change from 540 to 1000 r.p.m. for the rear PTO, the adapter 58 is removed and is replaced with a 1000 r.p.m. adapter 88. This, as will be seen from FIG. 2, is without a forward projection, such as that at 64, on the adapter 58. Therefore, there is nothing to force the shaft 20 forwardly, whereby the spring 66 shifts the shaft rearwardly, disengaging the teeth 76–78 and engaging the teeth 72–74. This of course has no effect on the relationship between the front PTO 30 and the gear 14, since, as already described, the front PTO has but a single speed.

A typical control for shifting the connect-disconnect sleeve 56 may comprise a shifter fork 90 fixed to a fore-and-aft shiftable rail 92 supported in a pair of sleeves 94 and 96 in adjacent portions of the housing 10. In the posture of the mechanism shown in FIG. 1, the rail 92 contains a detent 98 which engages a notch 100 in the sleeve 96, establishing the coupled position of the sleeve 56 relative to the spline sets 52 and 54. When the rail is shifted to the rear (to the left as seen in the drawings) the detent engages a second notch 102 which corresponds to the position that the rail will assume when the sleeve 56 is shifted rearwardly on the spline set 54 sufficiently to clear the spline set 52. Thus, when the mechanism is operating at 540 r.p.m., the rail 92 is shiftable back and forth between the positions established by the detent notches 100 and 102 to establish respectively the connect and disconnect status of the sleeve 56.

When the power shaft 20 shifts to the rear under action of the spring 66 when the 1000 r.p.m. adapter 88 is installed, this will of course make a difference in the position of the sleeve 56. To compensate for this, the rail 92 is shifted rearwardly in its sleeves 94 and 96 so that the detent engages still another notch 104 in the sleeve 96. A fourth notch 106 establishes the disconnect position for the sleeve 56 in the 1000 r.p.m. phase. In other words, in each phase of operation of the PTO drive, the shifter rail 92 occupies a two-position relationship, but the position in one case is offset to the rear from that of the other case. Any suitable external control mechanism, not material here, may be used to shift the rail 92 irrespective of its position relative to the detent sleeve 96.

Features and advantages other than those enumerated will readily occur to those versed in the art, as will many modifications and alterations in the preferred embodiment disclosed, all of which may be achieved without departure from the spirit and scope of the invention.

What is claimed is:

1. A two-speed PTO, comprising: a support; first and second coaxial closely spaced apart gears arranged for relative rotation and constrained against axial shifting, each gear having an axially apertured hub including an annular set of internal clutch teeth; a shaft rotatable relative to the gears and extending axially through the apertured hubs and carried by the support for axial shifting relative to the gears between first and second positions, said shaft having annular means thereon including external clutch teeth matching the aforesaid teeth and engageable with only the first gear internal teeth in the first position of said shaft and with only the second gear internal teeth in the second position of said shaft; means for driving the gears respectively at different speeds; a second shaft disposed coaxially with the first-mentioned shaft and arranged to enable said relative axial shifting of said first-mentioned shaft; means journaling said second shaft on the support for rotation relative to the gears and first-mentioned shaft and constraining said second shaft against axial shifting from one of said positions; and clutch means selectively connectible and disconnectible between the second shaft and the proximate one of the gears.

2. The invention defined in claim 1, in which: the end of the second shaft facing the first-mentioned shaft is axially hollow and telescopically receives the proximate end of said first-mentioned shaft; and bearing means is provided within said hollow end for inter-journaling said two shaft ends.

3. The invention defined in claim 2, in which: said hollow end has an interior abutment beyond said end of the first-mentioned shaft and the means journaling and constraining the first mentioned shaft includes a spring acting between said abutment and said first-mentioned shaft for biasing the latter to one of its positions.

4. The invention defined in claim 3, in which: said end of the first-mentioned shaft has an axial recess opening toward said abutment and in part housing said spring.

5. A two-speed PTO, comprising: a support; first and second coaxial closely spaced apart gears arranged for relative rotation and constrained against axial shifting, each gear having an axially apertured hub including an annular set of internal clutch teeth; a shaft rotatable relative to the gears and extending axially through the apertured hubs and carried by the support for axial shifting relative to the gears between first and second positions, said shaft having annular means thereon including external clutch teeth matching the aforesaid teeth and engageable with only the first gear internal teeth in the first position of said shaft and with only the second gear internal teeth in the second position of said shaft; means biasing the shaft to one of said first and second positions, said shaft being adapted to be urged against said biasing means to the other of said first and second positions; means for driving the gears respectively at different speeds; said shaft being made up of first and second coaxial sections affording an end-to-end junction in axially spaced relation to the gears; and means for selectively coupling and uncoupling said sections at said junction.

6. The invention defined in claim 5, in which: one of said sections has an axial bore therein facing the other section and said other section has a reduced bearing extension recieved by and journaled in said bore.

7. A two-speed PTO, comprising: a support; first and second coaxial closely spaced apart gears arranged for relative rotation and constrained against axial shifting, each gear having an axially apertured hub including an annular set of internal clutch teeth; a shaft rotatable relative to the gears and extending axially through the apertured hubs and carried by the support for axial shifting relative to the gears between first and second positions, said shaft having annular means thereon including external clutch teeth matching the aforesaid teeth and engageable with only the first gear internal teeth in the first position of said shaft and with only the second gear internal teeth in the second position of said shaft; means biasing the shaft to one of said first and second positions, said shaft being adapted to be urged against said biasing means to the other of said first and second positions; means for driving the gears respectively at different speeds; said hubs having axially proximate ends and axially opposite remote ends and the sets of internal teeth are provided respectively at said remote ends, said annular means on the shaft comprising first and second teeth sets spaced apart an axial distance greater than that between said hub sets so that in either position of the shaft one shaft set engages one hub set and the other shaft set projects axially beyond the remote end of the other hub; said support including a coaxial recess closely adjacent to the remote end of one hub for accommodating one disengaged hub set; and means on the support including a coaxial recess closely adjacent to the remote end of the other hub for accommodating the other disengaged hub set.

8. The invention defined in claim 7, in which: said last named means includes a coaxial shaft having an axial pocket providing said recess; and clutch means is provided for selectively connecting and disconnecting said second shaft and the proximate one of the gears.

9. A two-speed PTO, comprising: a support; first and second coaxial closely spaced apart gears arranged for relative rotation and constrained against axial shifting, each gear having an axially apertured hub including an annular set of internal clutch teeth; a shaft rotatable relative to the gears and extending axially through the apertured hubs and carried by the support for axial shifting relative to the gears between first and second positions, said shaft having annular means thereon including external clutch teeth matching the aforesaid teeth and engageable with only the first gear internal teeth in the first position of said shaft and with only the second gear internal teeth in the second position of said shaft; means biasing the shaft to one of said first and second positions, said shaft being adapted to be urged against said biasing means to the other of said first and second positions; means for driving the gears respectively at different speeds; said shaft being made up of first and second coaxial sections affording an end-to-end junction in axially spaced relation to the gears; said ends of said sections at said junction being provided respectively with complementary sets of external splines and internal interjournaling bearing means; and an internally splined sleeve carried by said external spline sets for selective axial shifting between a connecting position bridging both spline sets and a disconecting position engaging only one spline set.

10. The invention defined in claim 9, including: shift means carried by the support for shifting said sleeve, said shift means itself being selectively settable on the support in either of two positions according to the axial position of the shaft.

References Cited by the Examiner

UNITED STATES PATENTS 1,422,072   11/1922   Amundson _____ 74—371

FOREIGN PATENTS 922,569   1/1955   Germany.

MILTON KAUFMAN, *Primary Examiner.*